(12) United States Patent
Dockery et al.

(10) Patent No.: US 10,647,887 B2
(45) Date of Patent: May 12, 2020

(54) TUNGSTEN BUFF POLISHING COMPOSITIONS WITH IMPROVED TOPOGRAPHY

(71) Applicant: Cabot Microelectronics Corporation, Aurora, IL (US)

(72) Inventors: Kevin P. Dockery, Aurora, IL (US); Pankaj K. Singh, Plainfield, IL (US); Steven Grumbine, Aurora, IL (US); Kim Long, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 209 days.

(21) Appl. No.: 15/864,720

(22) Filed: Jan. 8, 2018

(65) Prior Publication Data

US 2019/0211227 A1 Jul. 11, 2019

(51) Int. Cl.
*B24B 37/04* (2012.01)
*C09G 1/02* (2006.01)
*C09K 3/14* (2006.01)

(52) U.S. Cl.
CPC .............. *C09G 1/02* (2013.01); *B24B 37/044* (2013.01); *C09K 3/1409* (2013.01); *C09K 3/1436* (2013.01); *C09K 3/1463* (2013.01)

(58) Field of Classification Search
CPC .............................. B24B 1/005; B24B 37/044
USPC ......................................................... 451/36
See application file for complete search history.

(56) References Cited

U.S. PATENT DOCUMENTS

| | | | | |
|---|---|---|---|---|
| 6,293,848 B1* | 9/2001 | Fang | ..................... | C09K 3/1463 252/79.1 |
| 2002/0093002 A1* | 7/2002 | Tsuchiya | ................... | C09G 1/02 252/79.1 |
| 2002/0123299 A1* | 9/2002 | Chopra | ............... | B24B 37/0056 451/36 |
| 2005/0198912 A1* | 9/2005 | Kim | ..................... | C09K 3/1463 51/307 |
| 2007/0132153 A1* | 6/2007 | Aiyer | ..................... | B24B 1/005 264/430 |
| 2010/0181525 A1 | 7/2010 | Belmont | | |
| 2011/0053462 A1* | 3/2011 | Shida | ....................... | C09G 1/02 451/36 |
| 2011/0059680 A1* | 3/2011 | Motonari | ................ | C09G 1/02 451/36 |
| 2011/0104992 A1* | 5/2011 | Haga | ....................... | C09G 1/02 451/36 |
| 2011/0275286 A1* | 11/2011 | Menapace | ............... | B24B 1/005 451/41 |
| 2013/0005219 A1 | 1/2013 | Takemura et al. | | |
| 2014/0312266 A1 | 10/2014 | Park et al. | | |
| 2015/0132955 A1 | 5/2015 | Yamato et al. | | |
| 2015/0267081 A1 | 9/2015 | Fu et al. | | |
| 2015/0322294 A1 | 11/2015 | Onishi | | |
| 2016/0153095 A1 | 6/2016 | Yoshizaki | | |
| 2017/0342304 A1 | 11/2017 | Ashitaka et al. | | |
| 2018/0057711 A1* | 3/2018 | Onishi | ................ | C09K 3/1463 |
| 2018/0111248 A1 | 4/2018 | Mitsumoto et al. | | |
| 2019/0010356 A1* | 1/2019 | Singh | ....................... | C09G 1/02 |
| 2019/0185713 A1* | 6/2019 | Mosley | ............. | H01L 21/31053 |

FOREIGN PATENT DOCUMENTS

| | | |
|---|---|---|
| EP | 2533274 A1 | 12/2012 |
| WO | 2008005160 A1 | 1/2008 |
| WO | 2010134542 A1 | 11/2010 |

OTHER PUBLICATIONS

Guanghui Fu, Modeling of chemical mechanical polishing at multiple scales, 2002, Iowa State University Retrospective Theses and Dissertations, Paper 995.
Robert Vacassy et al., Edge-over-erosion in tungsten CMP, Jan. 2006, www.researchgate.net.
Korean Intellectual Property Office as ISA, International Search Report and Written Opinion of the ISA issued in connection with Application No. PCT/US2019/012258 dated Apr. 30, 2019.

* cited by examiner

*Primary Examiner* — George B Nguyen
(74) *Attorney, Agent, or Firm* — Thomas Omholt; Erika S. Wilson; Derek W. Barnett

(57) ABSTRACT

The invention provides a chemical-mechanical polishing composition comprising a) surface-modified colloidal silica particles, comprising a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, b) an iron compound, c) a stabilizing agent, d) a corrosion inhibitor, and e) an aqueous carrier. The invention also provides a method suitable for polishing a substrate.

36 Claims, No Drawings

TUNGSTEN BUFF POLISHING COMPOSITIONS WITH IMPROVED TOPOGRAPHY

BACKGROUND OF THE INVENTION

In the fabrication of integrated circuits and other electronic devices, multiple layers of conducting, semiconducting, and dielectric materials are deposited onto or removed from a substrate surface. As layers of materials are sequentially deposited onto and removed from the substrate, the uppermost surface of the substrate may become non-planar and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization also is useful in forming features on a substrate by removing excess deposited material used to fill the features and to provide an even surface for subsequent levels of metallization and processing.

Compositions and methods for planarizing or polishing the surface of a substrate are well known in the art. Chemical-mechanical planarization, or chemical-mechanical polishing (CMP), is a common technique used to planarize substrates. CMP utilizes a chemical composition, known as a CMP composition or more simply as a polishing composition (also referred to as a polishing slurry), for selective removal of material from the substrate. Polishing compositions typically are applied to a substrate by contacting the surface of the substrate with a polishing pad (e.g., polishing cloth or polishing disk) saturated with the polishing composition. The polishing of the substrate typically is further aided by the chemical activity of the polishing composition and/or the mechanical activity of an abrasive suspended in the polishing composition or incorporated into the polishing pad (e.g., fixed abrasive polishing pad).

Substrates that have tungsten features disposed between dielectric features include semiconductor substrates that include tungsten "plug" and "interconnect" structures provided between features of dielectric material. The dielectric material (e.g., a silicon oxide) conforms to the underlying topography of the substrate and as such, the surface of the dielectric material typically is characterized by an uneven combination of raised areas of the dielectric material separated by trenches in the dielectric material. The region of the substrate surface that includes the raised dielectric material and trenches is referred to as a pattern field of the substrate, e.g., as "pattern material," "pattern oxide," or "pattern dielectric."

To produce tungsten "plug" and "interconnect" structures, tungsten is applied over a surface that contains a patterned structure made at least in part from dielectric material. Due to variation in the depth of the trenches, it typically is necessary to deposit an excess of tungsten on top of the substrate to ensure complete filling of all trenches. The excess tungsten is then removed by CMP processing to expose the underlying dielectric layer and to produce a planar surface of the tungsten disposed between the spaces of the dielectric material. The tungsten can be removed in a "polishing" step or a "buffing" step, wherein a suitable tungsten removal rate may be desirable, but wherein other performance requirements (e.g., topography performance) also are important.

The special requirements of tungsten buffing slurries which combine the need for tungsten removal with the removal of other film types, such as dielectric oxide films like silicon oxide, present significant challenges. The topography and throughput needs of advanced tungsten nodes require CMP slurries with a combination of improved topography performance, such as lower erosion of oxide, improved performance with extended overpolishing, and reduced localized erosion phenomena such as edge-over erosion (EOE) in pattern arrays and erosion near isolated lines (sometimes referred to as fanging), without compromising film removal requirements. As suggested by the name, EOE or fanging refers to the local erosion near the edge of a patterned area.

However, known CMP slurries suffer from a number of drawbacks, e.g., slurries with film removal rate capability can suffer from excessive EOE which can cause yield loss. Alternatively, many slurries which can achieve desired topography performance suffer from low film removal rates which increases process times, decreasing device throughput. Moreover, topography performance and defectivity have been identified as gaps in existing silica-based tungsten buffing slurries. Anionic systems can improve defectivity while providing improved colloidal stability for improved shelf-life. However, the use of anionic silicas currently is limited due to a number of factors, for example, aluminium-doped silicas have limited operating formulation space due to pH limitations, attributable to Al-leaching. Also, known slurries formulated with anionic particles like MPS (mercapto-propylsilane sulfonated colloidal silica) are limited due to low film removal rates and poor pattern performance (e.g., high erosion or EOE).

Although EOE phenomena are known in various CMP applications, including silicon, copper, and tungsten CMP, the phenomena are not well understood. U.S. Pat. No. 6,114,248 discloses using reduced levels of colloidal and fumed silicas and increased alkaline chemistry in order to improve EOE in polysilicon polishing. Further, it has been proposed that EOE phenomena in copper CMP can be addressed by modifying electrochemical properties of copper (see, e.g., G. Banerjee and R. L. Rhoades (ECS Transactions, 2008, vol. 13, pp. 1-19)). However, chemical-based solutions to fanging in tungsten polishing applications are not likely to be suitable since tungsten has inherently different electrochemical properties from copper and from silicon. Others have proposed EOE in tungsten CMP can be addressed by modifying mechanical factors (e.g., using small particle colloidal silicas) or processing conditions (e.g., two-step high down force followed by low down-force setting during polishing or reconfiguration of the polishing assembly) (see, e.g., R. Vacassy and Z. Chen, "Edge Over Erosion in Tungsten CMP", 2006, https://www.research-gate.net/publication/290577656; S. H. Shin et al., Relative Motion and Asymmetry Effect Analyses in Tungsten CMP Process," http://www.planarization-cmp.org/contents/ICPT/PacRim2005/S5-2.pdf).

However, modifying processing parameters typically is undesirable due to the complex operations involved, possible decreases in throughput due to increased polishing times, and/or result in lack of uniform polishing characteristics which can negatively impact device yield. In addition, Applicants have found that tungsten polishing slurries formulated with small colloidal silica results in a high propensity of EOE phenomena in tungsten polishing applications.

Thus, there remains a need for compositions and methods for chemical-mechanical polishing of substrates that will provide useful removal rates while also providing improved planarization efficiency. The invention provides such polishing compositions and methods. These and other advantages of the invention, as well as additional inventive features, will be apparent from the description of the invention provided herein.

BRIEF SUMMARY OF THE INVENTION

The present invention provides a chemical-mechanical polishing composition comprising (a) surface-modified colloidal silica particles comprising a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, (b) an iron compound, (c) a stabilizing agent, (d) a corrosion inhibitor, and (e) an aqueous carrier.

The present invention also provides a method of chemically-mechanically polishing a substrate comprising (i) providing a substrate; (ii) providing a polishing pad; (iii) providing a chemical-mechanical polishing composition comprising (a) surface-modified colloidal silica a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, (b) an iron compound (c) a stabilizing agent, (d) a corrosion inhibitor, and (e) an aqueous carrier; (iv) contacting the substrate with the polishing pad and the chemical mechanical polishing composition; and (v) moving the polishing pad and the chemical-mechanical polishing composition relative to the substrate to abrade at least a portion of a surface of the substrate to polish the substrate.

DETAILED DESCRIPTION OF THE INVENTION

The invention provides a chemical-mechanical polishing composition comprising (a) surface-modified colloidal silica particles comprising a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, (b) an iron compound, (c) a stabilizing agent, (d) a corrosion inhibitor, and (e) an aqueous carrier.

Without wishing to be bound to any particular theory, Applicants have discovered that a polishing composition comprising the surface-modified particles described herein having a negative charge, a particle size of about 90 nm to about 350 nm, and a zeta potential of about −5 mV to about −35 mV at a pH of about 3 exhibit improved topography performance, including lower erosion and fanging.

The polishing composition comprises an abrasive that comprises, consists essentially of, or consists of surface-modified (e.g., surface-functionalized) colloidal silica particles, wherein the colloidal silica particles have been surface-modified such that the modified colloidal silica particles have a negatively charged group on the surface of the particle. Accordingly, the surface-modified colloidal silica particles have a negative charge. The negative charge is provided by modification of the silica abrasives with negatively charged groups covalently attached to the silica surface.

As used herein, the term "negative charge" refers to a negative charge on the surface-modified colloidal silica particles that is not readily reversible (i.e., irreversible or permanent), for example, via flushing, dilution, or filtration. A negative charge may be the result, for example, of covalently bonding an anionic species (e.g., a negatively-charged group) with the colloidal silica. In contrast, a reversible negative charge (a non-permanent negative charge) that may be the result, for example, of an electrostatic interaction between an anionic species and the colloidal silica, such as anionic surfactant or anionic polymer which can, for example, electrostatically bind to the surface of a silica particle.

The negatively-charged group can be any suitable group that can affect a negative charge on the surface of the colloidal silica particles. For example, the negatively-charged group can be an organic acid (e.g., carboxylic acid, sulfonic acid, and/or phosphonic acid). In a preferred embodiment, the negatively-charged group comprises a sulfonate group, a carboxylate group, a phosphonate group, or combinations thereof.

In a preferred embodiment, the sulfonate group is a silane containing one or more sulfonate groups or sulfate groups. The sulfonate group also can be a sulfonate or sulfate precursor, which can subsequently be transformed into sulfonate or sulfate, for example, by oxidation. Suitable sulfonate groups include, for example, 3-(trihydroxysilyl)-1-propanesulfonic acid, triethoxysilylpropyl (polyethyleneoxy)propylsulfonic acid salts thereof such as potassium salts. Suitable sulfonate precursors include, for example, 3-mercaptopropyltrimethoxysilane, (mercaptomethyl)methyldiethoxysilane, and 3-mercaptopropyulmethyldimethoxysilane.

Suitable carboxylate groups or carboxylate precursors include, for example, (3-triethoxysilyl)propylsuccinic anhydride, carboxyethylsilane triol or salts thereof, and N-(trimethoxysilylpropyl)ethylenediaminetriacetic acid or salts thereof. A carboxylate precursor is converted (e.g., oxidation) to or converts in situ (e.g., during work-up) to a carboxylate group.

Suitable phosphonate groups include, for example, 3-(trihydroxysilyl)propyl methylphosphonic acids and salts thereof.

The negatively charged group also may be a silane coupling agent. Silane coupling agents can be used to modify the silica surface to provide surface-modified colloidal silica particles according to the invention. Examples of silane coupling agents which incorporated negatively charged groups or precursors for negatively charged groups are described by Gelest, Inc. (Silane Coupling Agents, Copyright 2014, Gelest, Inc., Morrisville, Pa.) and are included here by reference.

The surface-modified colloidal silica particles can be prepared using any suitable method. Typically, the colloidal silica particles, prior to surface-modification with the negatively-charged group(s) (i.e., unmodified colloidal silica particles), are free or substantially free of negatively charged groups. The unmodified colloidal silica particles can be any suitable colloidal silica particles and are typically "wet-process" colloidal silica particles. As used herein, "wet-process" silica refers to a silica prepared by a precipitation, condensation-polymerization, or similar process (as opposed to, for example, fumed or pyrogenic silica). In a preferred embodiment, the colloidal silica particles are prepared by condensation-polymerization of $Si(OH)_4$. The precursor $Si(OH)_4$ can be obtained, for example, by hydrolysis of high purity alkoxysilanes such as tetramethylorthosilicate (TMOS). Such colloidal silica particles can be obtained as various commercially available products, such as the Fuso Chemical Co.'s "PL" colloidal silica products, such as PL-5 and PL-7. In another preferred embodiment, the silica particles are prepared from sodium silicates. Sodium silicates useful to the invention can for example be obtained from Nalco. Examples of commercial colloidal silicas derived from sodium silicate include Nalco 1050, 2327, and 2329 products, as well as other similar products available from DuPont, Bayer, Applied Research, Nissan Chemical, and Clariant.

The colloidal silica particles can be surface-modified using any suitable method. In an embodiment, the surface treatment for providing a negatively-charged group to the surface of the colloidal silica particle is through silane surface reaction with the colloidal silica. For example, in the case of covalently attaching a sulfonic acid (e.g., a sulfonate group), which is an organic acid, to the colloidal silica, attachment can be carried out according to the method of Cano-Serrano et al., "Sulfonic acid-functionalized silica through quantitative oxidation of thiol groups", *Chem. Commun.*, 2003(2): 246-247 (2003). Specifically, the colloidal silica with sulfonic acids covalently attached to its surface is obtained by coupling silane coupling agents having a thiol group such as (3-mercaptopropyl)trimethoxysilane with the colloidal silica and then oxidizing the thiol group using a hydrogen peroxide water. Alternatively, for example, in the case of covalently attaching a carboxylic acid (i.e., a carboxylate group) to the colloidal silica, attachment can be carried out according to the method of Yamaguchi et al., "Novel silane coupling agents containing a photolabile 2-nitrobenzyl ester for introduction of a carboxy group", *Chemistry Letters,* 3: 228-229 (2000). Specifically, the colloidal silica with a carboxylic acid covalently attached to its surface is obtained by coupling silane coupling agents containing photosensitive 2-nitrovinyl ester with the colloidal silica and then irradiating it with light.

The surface-modified colloidal silica particles have a particle size of about 90 nm to about 350 nm. As used herein, particle size refers to the diameter of the smallest sphere that encompasses the particle. The particle size of the colloidal silica particles can be measured using any suitable technique, for example, light scattering techniques. Suitable particle size measurement instruments are available from, for example, Malvern Instruments (Malvern, UK). The particle size can be measured using any suitable technique known to those skilled in the art, for example, laser diffraction techniques, differential centrifugal sedimentation (DCS) using a disc centrifuge such as from CPS Instruments (Prairieville, La.) (e.g., CPS Disc Centrifuge Model DC24000UHR).

Thus, the surface-modified colloidal silica particles can have a particle size of about 90 nm or more, for example, about 95 nm or more, about 100 nm or more, about 105 nm or more, about 110 nm or more, about 115 nm or more, about 120 nm or more, about 125 nm or more, about 130 nm or more, about 135 nm or more, about 140 nm or more, about 145 nm or more, about 150 nm or more, about 155 nm or more, about 160 nm or more, about 165 nm or more, about 170 nm or more, about 175 nm or more, about 180 nm or more, about 185 nm or more, about 190 nm or more, about 195 or more, or about 200 nm or more. Alternatively, or in addition, the colloidal silica particles can have a particle size of about 350 nm or less, for example, about 345 nm or less, about 340 nm or less, about 335 nm or less, about 330 nm or less, about 325 nm or less, about 320 nm or less, about 315 nm or less, about 310 nm or less, about 305 nm or less, about 300 nm or less, about 295 nm or less, about 290 nm or less, about 285 nm or less, about 280 nm or less, about 275 nm or less, about 270 nm or less, about 265 nm or less, about 260 nm or less, about 255 nm or less, about 250 nm or less, about 245 nm or less, about 240 nm or less, about 235 nm or less, about 230 nm or less, about 225 nm or less, about 220 nm or less, about 215 nm or less, about 210 nm or less, or about 205 nm or less. Thus, the colloidal silica particles can have a particle size bounded by any two of the aforementioned endpoints. For example, the colloidal silica particles can have a particle size of about 90 nm to about 350 nm, about 95 nm to about 345 nm, about 90 nm to about 340 nm, or about 85 nm to about 335 nm.

In an embodiment, the colloidal silica particles have a particle size of about 90 nm to about 200 nm.

In another embodiment, the colloidal silica particles have a particle size of about 120 nm to about 180 nm.

The surface-modified colloidal silica particles have a negative zeta potential, more particularly, a zeta potential of about −5 mV to about −35 mV (e.g., about −10 mV, about −15 mV, about −20 mV, about −25 mV, or about −30 mV) at a pH of about 3. The zeta potential of a particle refers to the difference between the electrical charge of the ions surrounding the particle and the electrical charge of the bulk solution (e.g., the aqueous carrier and any other components dissolved therein). The zeta potential is typically dependent on the pH of the aqueous medium (e.g., aqueous carrier). For a given polishing composition, the isoelectric point of the particles is defined as the pH at which the zeta potential is zero. As the pH is increased or decreased away from the isoelectric point, the surface charge (and hence the zeta potential) is correspondingly decreased or increased (to negative or positive zeta potential values). Moreover, in the context of the present invention, the zeta potential is an indicator of the degree of surface-modification of the colloidal silica particles since a more negative zeta potential over a pH range of about 1 to about 4 generally corresponds to a higher degree of surface-modification.

Accordingly, any two of the aforementioned zeta potential values can be used to define a range. For example, surface-modified colloidal silica particles can have a zeta potential of about −5 mV to about −35 mV, about −10 mV to about −25 mV, or about −15 mV to about −20 mV at a pH of about 3. By way of further example, the surface-modified colloidal silica particles can have a zeta potential of about −5 mV, about −6 mV, about −7 mV, about −8 mV, about −9 mV, about −10 mV, about −11 mV, about −12 mV, about −13 mV, about −14 mV, about −15 mV, about −16 mV, about −17 mV, about −18 mV, about −19 mV, about −20 mV, about −21 mV, about −22 mV, about −23 mV, about −24 mV, about −25 mV, about −26 mV, about −27 mV, about −28 mV, about −29 mV, about −30 mV, about −31 mV, about −32 mV, about −33 mV, about −34 mV, or about −35 mV at a pH of about 3. Thus, the surface-modified colloidal silica particles have a suitable zeta potential over a suitable pH range. Typically, the pH of the polishing composition is about 1.5 to about 4 (e.g., a pH of about 1.6, about 1.7, about 1.8, about 1.9, about 2, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, or about 3.9). For example, the pH of the polishing composition can be from about 1.6 to about 3.9, about 1.7 to about 3.8, about 1.8 to about 3.7, about 1.9 to about 3.6, or about 2.0 to about 3.5.

In some embodiments, the surface-modified colloidal silica particles have a zeta potential of about −5 mV to about −25 mV over a pH range of about 2 to about 4.

In some embodiments, the surface-modified colloidal silica particles have a zeta potential of about −10 mV to about −20 mV over a pH range of about 2 to about 4.

The zeta potential of the polishing composition can be measured by any suitable means, for example, using commercially available instrumentation such as the DT-1202, an electro-acoustic spectrometer available from Dispersion Technology, Inc. (Bedford Hills, N.Y.). In order to measure the zeta-potential on the DT-1202, it is preferred that the solution be measured at the solids concentration corresponding to the abrasive concentration used in chemical mechanical polishing, for example 2% solids.

The chemical-mechanical polishing composition can comprise any suitable amount of surface-modified colloidal silica particles. If the composition comprises too little surface-modified colloidal silica particles, the composition may not exhibit sufficient removal rate. In contrast, if the polishing composition comprises too much surface-modified colloidal silica particles, the composition may exhibit undesirable polishing performance, may not be cost effective, and/or may lack stability.

The surface-modified colloidal silica particles are suspended in the aqueous carrier of the polishing composition such that surface-modified colloidal silica particles desirably are colloidally stable. As used herein, the term "colloidally stable" refers to the suspension of abrasive particles in the aqueous carrier (e.g., water) and refers to the maintenance of that suspension over time. In the context of the present invention, abrasive particles (i.e., surface-modified colloidal silica particles) are considered colloidally stable if, when the abrasive particles are placed into a 100 mL graduated cylinder and allowed to stand unagitated for a time of 2 hours, the difference between the concentration of particles in the bottom 50 mL of the graduated cylinder ([B] in terms of g/mL) and the concentration of particles in the top 50 mL of the graduated cylinder ([T] in terms of g/mL) divided by the initial concentration of particles in the abrasive composition ([C] in terms of g/mL) is less than or equal to 0.5 (i.e., $\{[B]-[T]\}/[C] \leq 0.5$). The value of $[B]-[T]/[C]$ desirably is less than or equal to 0.3, and preferably is less than or equal to 0.1.

Accordingly, the surface-modified colloidal silica particles typically are present in the polishing composition at a concentration of about 5 wt. % or less, for example, about 4.5 wt. % or less, about 4 wt. % or less, about 3.5 wt. % or less, about 3 wt. % or less, or about 2.5 wt. % or less. Alternatively, or in addition, the surface-modified colloidal silica particles can be present in the polishing composition at a concentration of about 0.5 wt. % or more, for example, about 1 wt. % or more, about 1.5 wt. % or more, or about 2 wt. % or more. Thus, the surface-modified colloidal silica particles can be present in the polishing composition in a concentration bounded by any two of the aforementioned endpoints. For example, the surface-modified colloidal silica particles can be present in the polishing composition at a concentration of about 0.5 wt. % to about 5 wt. %, e.g., about 1 wt. % to about 4.5 wt. %, about 1.5 wt. % to about 4 wt. %, about 2 wt. % to about 3.5 wt. %, or about 2.5 wt. % to about 3 wt. %.

In a preferred embodiment, the surface-modified colloidal silica particles are present in the polishing composition in a concentration of about 1.5 wt. % to about 3.5 wt. %.

The polishing composition of the invention comprises an iron compound. Examples of iron-containing salts are described in U.S. Pat. Nos. 5,958,288 and 5,980,775, both of which are incorporated herein by reference. Suitable iron compounds (e.g. iron containing salts) include, for example, salts of ferric (iron III) or ferrous (iron II) compounds such as iron nitrate, iron sulfate, an iron halide (including fluoride, chloride, bromide, iodide, as well as perchlorates, perbromates, and periodates), or an organic iron compound such as an iron acetate, acetylacetonate, citrate, gluconate, malonate, oxalate, phthalate, or succinates.

In a preferred embodiment, the iron compound is ferric nitrate or a hydrate thereof (e.g., ferric nitrate nonahydrate).

The polishing composition can contain any suitable amount of iron compound. If the polishing composition comprises too little iron compound, the composition may not exhibit sufficient removal rate. In contrast, if the polishing composition comprises too much iron compound, the composition may exhibit undesirable polishing performance, may not be cost effective, and/or may lack stability. Accordingly, the iron compound typically is present in the polishing composition at a concentration of about 0.5 wt. % or less, for example, about 0.1 wt. % or less, or about 0.05 wt. % or less. Alternatively, or in addition, the iron compound can be present in the polishing composition at a concentration of about 0.001 wt. % or more, for example, about 0.005 wt. % or more, or about 0.01 wt. % or more. Thus, the iron compound can be present in the polishing composition in a concentration bounded by any two of the aforementioned endpoints, for example, in a concentration of about 0.001 wt. % to about 0.5 wt. %, about 0.005 wt. % to about 0.1 wt. %, or about 0.01 wt. % to about 0.05 wt. %.

The polishing composition of the invention comprises a stabilizing agent. Without wishing to be bound to any particular theory, the stabilizing agent helps to control the amount of free metal cation in the composition, thereby attenuating the rate of the catalyst to optimize polishing performance, as described in U.S. Pat. Nos. 5,980,775 and 6,068,787, both of which are incorporated herein by reference.

In another embodiment of the invention, the iron compound can be immobilized on the surface of the abrasive. For example, the iron compound may be comprised of an iron salt with a stabilizing agent that is attached to the surface of the abrasive.

In an embodiment, the stabilizing agent comprises phosphoric acid, o-phosphorylethanolamine, phosphonic acid, alendronic acid, acetic acid, phthalic acid, citric acid, adipic acid, oxalic acid, malonic acid, aspartic acid, succinic acid, glutaric acid, pimelic acid, suberic acid, azelaic acid, sebacic acid, oxalic acid, maleic acid, glutaconic acid, muconic acid, ethylenediaminetetraacetic acid, propylenediaminetetraacetic acid, or combinations thereof.

In a preferred embodiment, the stabilizing agent comprises malonic acid.

The polishing composition can comprise any suitable amount of stabilizing agent. If the composition comprises too little stabilizing agent, the composition may not exhibit sufficient stability. In contrast, if the polishing composition comprises too much stabilizing agent, the composition may exhibit undesirable polishing performance, may not be cost effective, and/or may become unstable. Accordingly, the stabilizing agent typically is present in the polishing composition in a concentration of about 1 wt. % or less, for example, about 0.5 wt. % or less, about 0.1 wt. % or less, about 0.05 wt. % or less, or about 0.01 wt. % or less. Alternatively, or in addition, the stabilizing agent can be present in the polishing composition in a concentration of about 0.0001 wt. % or more, for example, about 0.0005 wt. % or more, about 0.001 wt. % or more, or about 0.005 wt. % or more. Thus, the stabilizing agent can be present in the polishing composition in a concentration bounded by any two of the aforementioned endpoints. For example, the stabilizing agent can be present in the polishing composition in a concentration of about 0.0001 wt. % to about 1 wt. %, e.g., about 0.0005 wt. % to about 0.5 wt. %, about 0.001 wt. % to about 0.1 wt. %, or about 0.005 wt. % to about 0.05 wt. %.

In a preferred embodiment, the polishing composition comprises a stabilizing agent in a concentration of about 0.0001 wt. % to about 0.01 wt. %.

The polishing composition of the invention comprises a corrosion inhibitor (e.g., film-forming agent). As used herein, a corrosion inhibitor is a compound, or mixture of compounds, that facilitates the formation of a passivation layer (i.e., a dissolution-inhibiting layer) on at least a portion of the surface being polished. Without wishing to be bound to any particular theory, corrosion inhibitors inhibit the conversion of solid metal into soluble metal compounds while at the same time allowing for effective removal of solid metal via the CMP operation. By way of example, classes of compounds that are useful corrosion inhibitors of tungsten etching include compounds having nitrogen containing functional groups such as nitrogen containing heterocycles, alkyl ammonium ions, amino alkyls, and amino acids. Useful amino alkyl corrosion inhibitors include, for example, hexylamine, tetramethyl-p-phenylene diamine, octylamine, diethylene triamine, dibutyl benzylamine, aminopropylsilanol, aminopropylsiloxane, dodecylamine, mixtures thereof, and synthetic and naturally occurring amino acids including, for example, arginine, lysine, tyrosine, glutamine, glutamic acid, cystine, and glycine (aminoacetic acid). The corrosion inhibitor can be any suitable corrosion inhibitor for any component(s) of the substrate. Preferably, the corrosion inhibitor is a tungsten-corrosion inhibitor or a silicon oxide-corrosion inhibitor.

In an embodiment, the corrosion inhibitor comprises glycine, alanine, lysine, arginine, histidine, or combinations thereof.

In a preferred embodiment, the corrosion inhibitor comprises alanine, glycine, lysine or arginine. The corrosion inhibitors may be used alone or in combination.

In another preferred embodiment, the corrosion inhibitor comprises glycine.

The polishing composition can comprise any suitable amount of corrosion inhibitor, when present. If the polishing composition comprises too little corrosion inhibitor, the polishing composition may not exhibit sufficient polishing performance. In contrast, if the polishing composition comprises too much corrosion inhibitor, the composition may exhibit undesirable polishing performance, may not be cost effective, and/or may lack stability. Typically, the polishing composition comprises about 0.005 wt. % to about 1 wt. % (e.g., about 0.01 wt. % to about 0.5 wt. %, or about 0.02 wt. % to about 0.2 wt. %) of the corrosion inhibitor(s), when present. In a preferred embodiment, the polishing composition comprises about 0.1 wt. % to about 0.5 wt. % of a corrosion inhibitor, when present.

The polishing composition comprises an aqueous carrier. The aqueous carrier comprises water (e.g., deionized water) and may contain one or more water-miscible organic solvents. Examples of organic solvents that can be used include alcohols such as propenyl alcohol, isopropyl alcohol, ethanol, 1-propanol, methanol, 1-hexanol, and the like; aldehydes such as acetylaldehyde and the like; ketones such as acetone, diacetone alcohol, methyl ethyl ketone, and the like; esters such as ethyl formate, propyl formate, ethyl acetate, methyl acetate, methyl lactate, butyl lactate, ethyl lactate, and the like; ethers including sulfoxides such as dimethyl sulfoxide (DMSO), tetrahydrofuran, dioxane, diglyme, and the like; amides such as N, N-dimethylformamide, dimethylimidazolidinone, N-methylpyrrolidone, and the like; polyhydric alcohols and derivatives of the same such as ethylene glycol, glycerol, diethylene glycol, diethylene glycol monomethyl ether, and the like; and nitrogen-containing organic compounds such as acetonitrile, amylamine, isopropylamine, imidazole, dimethylamine, and the like. Preferably, the aqueous carrier is water alone, i.e., without the presence of an organic solvent.

The inventive polishing composition desirably is stable during preparation, extended storage, transport, and use. A stable slurry is one that does not unduly separate or settle during storage (e.g., by settling of suspended abrasive particles), does not exhibit undue particle size growth during storage, and does not exhibit undue particle size growth during use, which would increase the level of defects (especially scratches) present at a surface of a processed substrate.

The polishing composition optionally further comprises one or more other additional components (i.e., additives). For example, depending on the desired polishing application, the inventive polishing composition can comprise one or more additives to improve or enhance the polishing performance. The additives desirably are compatible with other components of the polishing composition. Illustrative additional components include conditioners, scale inhibitors, dispersants, oxidizing agents, pH modifying compounds (e.g., acids or bases), and pH buffering compounds. The polishing composition can comprise a surfactant and/or rheological control agent, including viscosity enhancing agents and coagulants (e.g., polymeric rheological control agents, such as, for example, urethane polymers), a dispersant, a biocide (e.g., KATHON™ LX), and the like. Suitable surfactants include, for example, cationic surfactants, anionic surfactants, anionic polyelectrolytes, nonionic surfactants, amphoteric surfactants, fluorinated surfactants, and mixtures thereof.

The polishing composition can be prepared by any suitable technique, many of which are known to those skilled in the art. The polishing composition can be prepared in a batch or continuous process. Generally, the polishing composition can be prepared by combining the components herein in any order. The term "component" as used herein includes individual ingredients (e.g., surface-modified colloidal silica particles, iron compound, stabilizing agent, corrosion inhibitor, etc.) as well as any combination of the ingredients.

For example, the iron compound, stabilizing agent, and corrosion inhibitor can be added to the aqueous carrier (e.g., water) at the desired concentration(s). The pH can then be adjusted (as desired) and the surface-modified colloidal silica particles can be added to the mixture at the desired concentration to form the polishing composition. The polishing composition can be prepared prior to use, with one or more components added to the polishing composition just before use (e.g., within about 1 minute before use, or within about 1 hour before use, or within about 7 days before use). The polishing composition also can be prepared by mixing the components at the surface of the substrate during the polishing operation.

The polishing composition also can be provided as a concentrate which is intended to be diluted with an appropriate amount of the aqueous carrier, particularly water, prior to use. In such an embodiment, the polishing composition concentrate can comprise the surface-modified colloidal silica particles, iron compound, stabilizing agent, and corrosion inhibitor, and aqueous carrier, in amounts such that, upon dilution of the concentrate with an appropriate amount of water, each component of the polishing composition will be present in the polishing composition in a concentration within the appropriate range recited above for each component. Furthermore, as will be understood by those of ordinary skill in the art, the concentrate can contain an appropriate fraction of the water present in the final polishing composition in order to ensure that other components are at least partially or fully dissolved in the concentrate.

While the polishing composition can be prepared well before, or even shortly before, use, the polishing composition also can be produced by mixing the components of the polishing composition at or near the point-of-use. As utilized herein, the term "point-of-use" refers to the point at which the polishing composition is applied to the substrate surface (e.g., the polishing pad or the substrate surface itself). When the polishing composition is to be produced using point-of-use mixing, the components of the polishing composition are separately stored in two or more storage devices.

The invention further provides a method of chemically-mechanically polishing a substrate using the inventive CMP compositions described herein.

In an embodiment, the invention provides a method of chemically-mechanically polishing a substrate comprising (i) providing a substrate; (ii) providing a polishing pad; (iii) providing a chemical-mechanical polishing composition comprising (a) surface-modified colloidal silica a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, (b) an iron compound (c) a stabilizing agent, (d) a corrosion inhibitor, and (e) an aqueous carrier; (iv) contacting the substrate with the polishing pad and the chemical mechanical polishing composition; and (v) moving the polishing pad and the chemical-mechanical polishing composition relative to the substrate to abrade at least a portion of a surface of the substrate to polish the substrate.

The inventive polishing method can be used to polish any suitable substrate. The polishing compositions are particularly useful in the polishing of a substrate comprising a tungsten layer and a silicon oxide layer. Suitable substrates include, but are not limited to, flat panel displays, integrated circuits, memory or rigid disks, metals, semiconductors, inter-layer dielectric (ILD) devices, microelectromechanical systems (MEMS), 3D NAND devices, ferroelectrics, and magnetic heads. The polishing composition is particularly well-suited for planarizing or polishing a substrate that has undergone shallow trench isolation (STI) processing. Desirably, the substrate includes a dielectric-containing (e.g., silicon oxide-containing) surface, especially one having a region of pattern dielectric material that includes raised dielectric areas separated by trench areas of dielectric material. The substrate can further comprise at least one other layer, e.g., an insulating layer. The insulating layer can be a metal oxide, porous metal oxide, glass, organic polymer, fluorinated organic polymer, or any other suitable high or low-K insulating layer. The insulating layer can comprise, consist essentially of, or consist of silicon oxide, silicon nitride, or combinations thereof. The silicon oxide layer can comprise, consist essentially of, or consist of any suitable silicon oxide, many of which are known in the art. For example, the silicon oxide layer can comprise tetraethoxysilane (TEOS), high density plasma (HDP) oxide, borophosphosilicate glass (BPSG), high aspect ratio process (HARP) oxide, spin on dielectric (SOD) oxide, chemical vapor deposition (CVD) oxide, plasma-enhanced tetraethyl ortho silicate (PETEOS), thermal oxide, or undoped silicate glass. The substrate can further comprise a metal layer. The metal can comprise, consist essentially of, or consist of any suitable metal, many of which are known in the art, such as, for example, copper, tantalum, tungsten, titanium, platinum, ruthenium, iridium, aluminum, nickel, or combinations thereof.

In a preferred embodiment, the substrate comprises a tungsten layer and a silicon oxide layer on a surface of the substrate.

In another preferred embodiment, the substrate comprises tungsten plug and interconnect structures.

The polishing compositions of the invention advantageously exhibits a removal rate selectivity such that the polishing compositions are suitable for buff polishing applications. In addition, the inventive polishing compositions advantageously exhibit improved polishing performance (e.g., improved defectivity, reduced erosion, and reduced EOE.) well suited for producing high quality devices from the processed substrate.

In an embodiment of the invention, the ratio of the removal rate of the tungsten layer to the removal rate of the silicon oxide layer is about 0.5:1 to about 2.75:1, for example, about 1:1, about 2.5:1, about 1.25:1 to about 2.25:1, about 1.5:1 to about 2:1, about 1.75:1 to about 1.5, about 2:1 to about 1.25:1, about 2.25:1 to about 1:1, or about 2.5:1 to about 0.5:1.

The polishing performance of the inventive compositions can be evaluated using any suitable substrate or method. One type of substrate suitable for evaluating polishing performance is a substrate comprising a line and space (L&S) pattern, wherein a surface includes line fields and spaces. The line fields, or patterned fields, include line arrays of metal and oxide and can include isolated lines of metal in otherwise continuous fields of oxide. The line fields are distributed among fields (spaces) of continuous dielectric material. The line arrays include metal and oxide lines, such as lines of tungsten and silicon oxide, and may be of any density or size, for example alternating 1 µm-wide lines of metal and 1 µm-wide lines of oxide, i.e., a 50% 1 µm array, or alternating lines of different size or density, for example of 1 µm-wide lines of metal and 3 µm-wide lines of oxide, i.e., a 25% 1×3 µm array. The isolated metal lines are typically associated with the line arrays and are located in the oxide fields some distance from the arrays and typically are of the same dimension (width) as the metal lines in the array. For example, to one side of the 1×1 µm line array, there can be two 1 µm isolated lines of metal located in the otherwise continuous field of oxide and separated from one another and from the array by >100 µm. The fields of continuous dielectric material, for comparison, may typically be larger in dimension, and have a surface of continuous dielectric material such as a silicon oxide, for example TEOS. An exemplary field (or "space") of continuous dielectric material can be a 100×100 µm area.

To evaluate post-polishing pattern performance of such L&S substrates, the absolute oxide loss (material removed) that occurs at the continuous dielectric field is determined, such as by an optical method using commercially available equipment (F5X tool supplied by KLA Tencor, Milpitas, Calif.). The continuous dielectric field is used as a reference for the relative pattern measurements in the arrays. For example, a line array comprised of alternating tungsten metal and TEOS oxide lines can be measured by profilometry or atomic force microscopy (AFM) with respect to the continuous field oxide. Erosion is characterized as a difference in the relative height of the oxide, such as the 1 µm TEOS lines, in the line array, as compared to the continuous field oxide. A positive erosion value is interpreted as relative recess of the oxide lines as compared to the continuous field oxide. Metal dishing typically refers to the relative height of the metal lines as compared to the oxide lines in the line array. For example, in a 50% 1×1 µm line array, a value of 200 Å dishing is interpreted as 200 Å recess of the tungsten lines relative to the oxide lines. Adding the erosion and the dishing provides the total step height, in this case from the recessed (dished tungsten) to the field oxide. Total oxide or metal loss in the array can be determined by combining the dishing and erosion values with the absolute oxide loss values determined for the continuous field.

Other erosion phenomena associated with patterns are areas of localized erosion, such as increased erosion associated with edges of the line arrays or increased erosion in areas near in the isolated lines. For example, for 1 µm isolated line in a field of oxide, localized erosion can be observed as an increase in linewidth to >1 µm. The erosion can be described in terms of the increased linewidth or in terms of the linewidth increase to a particular depth with respect to the reference field or a combination of these two properties.

The chemical-mechanical polishing composition and method of the invention are particularly suited for use in conjunction with a chemical-mechanical polishing apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving the substrate relative to the surface of the polishing pad. The polishing of the substrate takes place by the substrate being placed in contact with the polishing pad and the polishing composition of the invention, and then the polishing pad moving relative to the substrate, so as to abrade at least a portion of the substrate to polish the substrate.

A substrate can be polished with the chemical-mechanical polishing composition using any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, co-formed products thereof, and mixtures thereof. Soft polyurethane polishing pads are particularly useful in conjunction with the inventive polishing method. Typical pads include but are not limited to SURFIN™ 000, SURFIN™ SSW1, SPM3100 Eminess Technologies), POLITEX™ (Dow Chemical Company), and POLYPAS™ 27 (Fujibo), NEXPLANAR™ E6088 and EPIC™ D100 pad commercially available from Cabot Microelectronics. A particularly preferred polishing pad is the rigid, microporous polyurethane pad (IC1010™) commercially available from Dow Chemical.

Desirably, the chemical-mechanical polishing apparatus further comprises an in situ polishing endpoint detection system, many of which are known in the art. Techniques for inspecting and monitoring the polishing process by analyzing light or other radiation reflected from a surface of the substrate being polished are known in the art. Such methods are described, for example, in U.S. Pat. Nos. 5,196,353, 5,433,651, 5,609,511, 5,643,046, 5,658,183, 5,730,642, 5,838,447, 5,872,633, 5,893,796, 5,949,927, and 5,964,643. Desirably, the inspection or monitoring of the progress of the polishing process with respect to a substrate being polished enables the determination of the polishing end-point, i.e., the determination of when to terminate the polishing process with respect to a particular substrate.

EMBODIMENTS (1) In embodiment (1) is presented a chemical-mechanical polishing composition comprising (a) surface-modified colloidal silica particles comprising a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, (b) an iron compound, (c) a stabilizing agent, (d) a corrosion inhibitor, and (e) an aqueous carrier.

(2) In embodiment (2) is presented the polishing composition of embodiment (1), wherein the negatively-charged group on the surface of the surface-modified colloidal silica particles comprises a sulfonate group, a carboxylate group, a phosphonate group, or combinations thereof.

(3) In embodiment (3) is presented the polishing composition of any one of embodiments (1) or (2), wherein the surface-modified colloidal silica particles have a particle size of about 90 nm to about 200 nm.

(4) In embodiment (4) is presented the polishing composition of embodiment (3), wherein the surface-modified colloidal silica particles have a particle size of about 120 nm to about 180 nm.

(5) In embodiment (5) is presented the polishing composition of any one of embodiments (1)-(4), wherein the pH of the polishing compound is about 1.5 to about 4.

(6) In embodiment (6) is presented the polishing composition of embodiment (5), wherein the pH of the polishing compound is about 2 to about 3.5.

(7) In embodiment (7) is presented the polishing composition of any one of embodiments (1)-(6), wherein the surface-modified colloidal silica particles are present in the polishing composition in a concentration of about 1.5 wt. % to about 3.5 wt. %.

(8) In embodiment (8) is presented the polishing composition of embodiment (7), wherein the surface-modified colloidal silica particles are present in the polishing composition in a concentration of about 2 wt. % to about 3 wt. %.

(9) In embodiment (9) is presented the polishing composition of any one of embodiments (1)-(8), wherein the iron compound comprises ferric nitrate or a hydrate thereof.

(10) In embodiment (10) is presented the polishing composition of any one of embodiments (1)-(9), wherein the stabilizing agent comprises phosphoric acid, o-phosphorylethanolamine, alendronic acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid, propylenediaminetetraacetic acid, or combinations thereof.

(11) In embodiment (11) is presented the polishing composition of embodiment (10), wherein the stabilizing agent comprises malonic acid.

(12) In embodiment (12) is presented the polishing composition of embodiment (10) or (11), wherein the stabilizing agent is present in the polishing composition in a concentration of about 0.0001 wt. % to about 0.01 wt. %.

(13) In embodiment (13) is presented the polishing composition of any one of embodiments (1)-(12), wherein the corrosion inhibitor comprises glycine, alanine, lysine, arginine, histidine, or combinations thereof.

(14) In embodiment (14) is presented the polishing composition of embodiment (13), wherein the corrosion inhibitor comprises alanine, glycine, lysine, and arginine.

(15) In embodiment (15) is presented the polishing composition of embodiment (14), wherein the corrosion inhibitor comprises glycine.

(16) In embodiment (16) is presented the polishing composition of any one of embodiments (1)-(15), wherein the corrosion inhibitor is present in the polishing composition in a concentration of about 0.005 wt. % to about 1 wt. %.

(17) In embodiment (17) is presented the polishing composition of embodiment (16), wherein the corrosion inhibitor is present in the polishing composition in a concentration of about 0.1 wt. % to about 0.5 wt. %.

(18) In embodiment (18) is presented a method of chemically-mechanically polishing a substrate comprising (i) providing a substrate, (ii) providing a polishing pad, (iii) providing a chemical-mechanical polishing composition comprising (a) surface-modified colloidal silica comprising a negatively-charged group on the surface of the particles, wherein the surface-modified colloidal silica particles have a negative charge, a particle size of about 90 nm to about 350 nm, and a zeta potential of about −5 mV to about −35 mV at a pH of about 3, (b) an iron compound, (c) a stabilizing agent, (d) a corrosion inhibitor, and (e) an aqueous carrier, (iv) contacting the substrate with the polishing pad and the chemical mechanical polishing composition, and (v) moving the polishing pad and the chemical-mechanical polishing composition relative to the substrate to abrade at least a portion of a surface of the substrate to polish the substrate.

(19) In embodiment (19) is presented the method of embodiment (18), wherein the negatively-charged group on the surface of the surface-modified colloidal silica particles comprises a sulfonate group, a carboxylate group, a phosphonate group, or combinations thereof.

(20) In embodiment (20) is presented the method of embodiment (18) or (19), wherein the surface-modified colloidal silica particles have a particle size of about 90 nm to about 200 nm.

(21) In embodiment (21) is presented the method of embodiment (20), wherein the surface-modified colloidal silica particles have a particle size of about 120 nm to about 180 nm.

(22) In embodiment (22) is presented the method of any one of embodiments (18)-(21), wherein the pH of the polishing compound is about 1.5 to about 4.

(23) In embodiment (23) is presented the method of embodiment (22), wherein pH of the polishing compound is about 2 to about 3.5.

(24) In embodiment (24) is presented the method of any one of embodiments (18)-(23), wherein the surface-modified colloidal silica particles are present in the polishing composition in a concentration of about 1.5 wt. % to about 3.5 wt. %.

(25) In embodiment (25) is presented the method of embodiment (24), wherein the surface-modified colloidal silica particles are present in the polishing composition in a concentration of about 2 wt. % to about 3 wt. %.

(26) In embodiment (26) is presented the method of any one of embodiments (18)-(25), wherein the iron compound comprises ferric nitrate or a hydrate thereof.

(27) In embodiment (27) is presented the method of any one of embodiments (18)-(26), wherein the stabilizing agent comprises phosphoric acid, o-phosphorylethanolamine, alendronic acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid, propylenediaminetetraacetic acid, or combinations thereof.

(28) In embodiment (28) is presented the method of embodiment (27), wherein the stabilizing agent comprises malonic acid.

(29) In embodiment (29) is presented the method of embodiment (27) or (28), wherein the stabilizing agent is present in the polishing composition in a concentration of about 0.0001 wt. % to about 0.01 wt. %.

(30) In embodiment (30) is presented the method of any one of embodiments (18)-(29), wherein the corrosion inhibitor comprises glycine, alanine, lysine, arginine, histidine, or combinations thereof.

(31) In embodiment (31) is presented the method of embodiment (30), wherein the corrosion inhibitor comprises alanine, glycine, lysine, or arginine.

(32) In embodiment (32) is presented the method of embodiment (31), wherein the corrosion inhibitor comprises glycine.

(33) In embodiment (33) is presented the method of any one of embodiments (18)-(32), wherein the corrosion inhibitor is present in the polishing compound in a concentration of about 0.005 wt. % to about 1 wt %.

(34) In embodiment (34) is presented the method of embodiment (33), wherein the corrosion inhibitor is present in the polishing composition in a concentration of about 0.1 wt. % to about 0.5 wt. %.

(35) In embodiment (35) is presented the method of any one of embodiments (18)-(34), wherein the substrate comprises a tungsten layer and a silicon oxide layer on a surface of the substrate, and wherein at least a portion of the tungsten layer and at least a portion of the silicon oxide layer are abraded to polish the substrate.

(36) In embodiment (36) is presented the method of embodiment (35), wherein the abrasion of at least a portion of the tungsten layer provides a removal rate for tungsten, wherein the abrasion of at least a portion of the silicon oxide layer provides a removal rate for silicon oxide, and wherein the ratio of the tungsten removal rate to the silicon oxide removal rate is about 0.5:1 to about 2.75:1.

EXAMPLES

The following examples further illustrate the invention but, of course, should not be construed as in any way limiting its scope.

The following abbreviations are used herein: MPS refers to (3-mercaptopropyl)trimethoxysilane; W refers to tungsten; TEOS refers to tetraethoxysilane; and RR refers to removal rate.

Example 1

This example demonstrates the effectiveness of a chemical-mechanical polishing composition comprising surface-modified colloidal silica particles, an iron compound, a stabilizing agent, a corrosion inhibitor, and an aqueous carrier, in accordance with an embodiment of the present invention. This example also demonstrates a method of chemically-mechanically polishing a substrate in accordance with an embodiment of the present invention.

Twelve different polishing compositions (Polishing Compositions 1A-1L) were prepared using one of seven different colloidal silica particles as set forth in Tables 1 and 2. The different colloidal particles were prepared using the amounts of MPS and hydrogen peroxide set forth in Table 1. Colloidal silica Particles P1 and P2 were colloidal silica particles obtained from FUSO Chemical Co. and were used without further modification and were used to prepare comparative Polishing Compostions 1A-1C. Colloidal silica Particle P1 had an average particle size of 68 nm (FUSO, PL-3). Colloidal silica Particle P2 had an average particle size of 120 nm (FUSO, PL-7).

Colloidal silica Particles P3-P7 were surface-modified using the procedure described herein and were used to prepare Polishing Compositions 1D-1L as set forth in Tables 1 and 2. Surface-modified colloidal silica Particles P3-P7 were prepared from colloidal silica particles having an average particle size either 68 nm (FUSO, PL-3), or 120 nm (FUSO, PL-7), as set forth in Table 1. The process for surface-modifying the colloidal silica particles was as follows: a reactor (10 L) was charged with deionized water and a colloidal silica dispersion to provide 3.5 kg of a 10% (w/v) $SiO_2$ colloidal dispersion. To this was added 0.5 g of a KOH (45%) solution to adjust pH to approximately 8.5 followed by the addition of MPS with stirring in the amount indicated in Table 1. The reactor was heated to 45° C. and maintained at temperature for 48 hours, after which hydrogen peroxide (30%) was added in a 3:1 molar ratio of $H_2O_2$:MPS and the solution was stirred for 6 hours at 45° C. The MPS and $H_2O_2$ reaction stoichiometry are set forth in Table 1.

TABLE 1

Surface-Modified Colloidal Silica Particles

| Polishing Composition(s)* | Colloidal Silica Particle | Particle Size (% w/v) | MPS (wt. %) | $H_2O_2$ added (%) |
|---|---|---|---|---|
| 1A, 1B (comparative) | P1 | 68 nm (20%) | — | — |
| 1C (comparative) | P2 | 120 nm (34%) | — | — |
| 1D, 1E (comparative) | P3 | 68 nm (11%) | 0.045 | 0.078 |
| 1F (comparative) | P4 | 68 nm (11%) | 0.065 | 0.112 |
| 1G (inventive) | P5 | 120 nm (11%) | 0.028 | 0.049 |
| 1H, 1I, 1J, 1K (inventive) | P6 | 120 nm (11%) | 0.037 | 0.064 |
| 1L (inventive) | P7 | 120 nm (11%) | 0.042 | 0.073 |

*See Table 2 for complete details of Polishing Compositions 1A-1L.

Polishing Compositions 1A-1L were prepared using the following procedure: to a stirred solution of deionized water was added, in the amounts indicated in Table 2, glycine (corrosion inhibitor), malonic acid (stabilizing agent), and iron nitrate nonahydrate (iron compound) followed by the colloidal silica particles from Table 1. The pH of the compositions was adjusted with either nitric acid (70%) or potassium hydroxide (45%) as required to obtain the pH indicated in Table 2. Hydrogen peroxide (oxidizing agent) was added to the slurry prior to polishing. In addition, each polishing composition contained 0.001 wt. % biocide (KATHON™ LX).

Polishing Compositions 1A-1F were comparative. Polishing Compositions 1A-1C contained unmodified colloidal silica particles. Polishing Composition 1D-1F contained surface-modified colloidal silica particles having an average particle size of 68 nm.

Polishing Compositions 1G-1L were inventive and each of Polishing Composition 1G-1L contained, inter alia, surface-modified colloidal silica particles and a particle size of about 90 nm to about 350 nm.

TABLE 2

Polishing Compositions

| Polishing Composition | Colloidal Silica Particle | Particle (wt. %) | Glycine (wt. %) | Malonic Acid (wt. %) | $Fe(NO_3)_3 \cdot 9H_2O$ (wt. %) | pH | $H_2O_2$ (wt. %) |
|---|---|---|---|---|---|---|---|
| 1A (comparative) | P1 | 3 | 0.1 | 0.0081 | 0.0036 | 2.2 | 0.3 |
| 1B (comparative) | P1 | 3 | 0.1 | 0.0081 | 0.0036 | 3.5 | 0.3 |
| 1C (comparative) | P2 | 3 | 0.1 | 0.0081 | 0.0036 | 2.2 | 0.3 |
| 1D (comparative) | P3 | 3.5 | 0.16 | 0.0023 | 0.001 | 3.5 | 0.5 |
| 1E (comparative) | P3 | 1 | 0.16 | 00068 | 0.003 | 3.5 | 0.5 |
| 1F (comparative) | P4 | 3.5 | 0.16 | 0.0068 | 0.003 | 3.5 | 0.5 |
| 1G (inventive) | P5 | 3 | 0.1 | 0.0081 | 0.0036 | 2.2 | 0.3 |
| 1H (inventive) | P6 | 3 | 0.1 | 0.0081 | 0.0036 | 2.2 | 0.3 |
| 1I (inventive) | P6 | 3.5 | 0.16 | 0.0023 | 0.001 | 2.5 | 0.5 |
| 1J (inventive) | P6 | 3.5 | 0.16 | 0.0068 | 0.0030 | 3.5 | 0.5 |
| 1K (inventive) | P6 | 1 | 0.16 | 0.0068 | 0.0030 | 2.5 | 0.5 |
| 1L (inventive) | P7 | 3.5 | 0.16 | 0.0023 | 0.001 | 2.5 | 0.5 |

Substrates comprising tungsten and TEOS were polished using polishing compositions 1A-1L to evaluate the blanket polishing performance. The following polishing conditions were used: tool=MIRRA™, pad=IC1010 or E6088, slurry flow rate=180 mL/min, platen speed/head speed=100/101 rpm, inner tube pressure/retaining ring pressure/membrane pressure=207/414/207 hPa, ex. situ conditioner=SAESOL™ C1 20 N.

The polishing results are set forth in Table 3.

TABLE 3

Polishing Compositions and Blanket Polishing Performance as a Function of Silica Particles (downforce = 207 hPa)

| Polishing Composition | Zeta Potential | PH | W RR (nm/min) | TEOS RR (nm/min) | Sel. TEOS/W |
|---|---|---|---|---|---|
| 1A (comparative) | −36 mV | 2.2 | 39.2 | 21.6 | 0.55 |
| 1B (comparative) | −39 mV | 3.5 | 38.0 | 8.2 | 0.22 |
| 1C (comparative) | −50 mV | 2.2 | 15.4 | 23.1 | 1.50 |
| 1D (comparative) | −11 mV | 3.5 | 41.3 | 20.2 | 0.49 |
| 1E (comparative) | −13 mV | 3.5 | 81.7 | 7.7 | 0.09 |
| 1F (comparative) | −28 mV | 3.5 | 72.4 | 13.5 | 0.19 |
| 1G (inventive) | −5 mV | 2.2 | 45.2 | 41.5 | 0.92 |
| 1H (inventive) | −5 mV | 2.2 | 51.6 | 41.1 | 0.80 |
| 1I (inventive) | −13 mV | 2.5 | 20.3 | 43.5 | 2.14 |
| 1J (inventive) | −22 mV | 3.5 | 67.2 | 26.2 | 0.39 |
| 1K (inventive) | −12 mV | 2.5 | 20.3 | 27.3 | 1.34 |
| 1L (inventive) | −15 mV | 2.5 | 24.9 | 37.6 | 1.51 |

As is apparent from the results set forth in Table 3, inventive Polishing Composition 1G, which contained a surface-modified colloidal silica particle having a particle size of 120 nm, exhibited a blanket tungsten removal rate of 45.2 nm/min and a TEOS removal rate of 41.5 nm/min. The tungsten removal rate of Polishing Composition 1G was approximately 15% greater than the tungsten removal rate of Polishing Composition 1A (i.e., 39.2 nm/min), which contained an unmodified colloidal silica particle having a particle size of 68 nm. In addition, the TEOS removal rate of Polishing Composition 1G was approximately twice the TEOS removal rate of Polishing Composition 1A (i.e., 21.6 nm/min).

A similar comparison between Polishing Compositions 1G and 1C demonstrates that Polishing Composition 1G exhibited a tungsten removal rate that was approximately three times greater and a TEOS removal rate approximately 1.8 times greater than the removal rates of comparative Polishing Composition 1C (15.4 nm/min and 23.1 nm/min, respectively).

Also apparent from the results set forth in Table 3 is the pH effect on oxide removal rate capability. For example, comparative Polishing Compositions 1A and 1B, which were identical other than pH (pH 2.2 and pH 3.5, respectively) exhibited different oxide removal rates (i.e., 21.6 nm/min and 8.2 nm/min, respectively) while exhibiting approximately the same tungsten removal rates (i.e., 39.2 nm/min and 38.0 nm/min, respectively). This indicates that comparative polishing compositions have a limited formulation space, because of very low oxide removal rates at higher pH values. In contrast, the inventive polishing compositions have extended pH capability with respect to oxide removal rates. For example, Polishing Composition 1J, which contains a surface-modified colloidal silica particle having an average particle size of about 120 nm and which has a pH of 3.5, has a TEOS removal rate of 26.2 nm/min, i.e., more than 3 times the oxide removal rate of comparative Polishing Composition 1B (i.e., 8.2 nm/min), which contains an unmodified colloidal silica particle having an average particle size of about 68 nm.

Example 2

This example demonstrates the effectiveness of a chemical-mechanical polishing composition comprising surface-modified colloidal silica particles, an iron compound, a stabilizing agent, a corrosion inhibitor, and an aqueous carrier, in accordance with an embodiment of the present invention. This example also demonstrates the pattern polishing performance of the inventive composition comprising these components.

Patterned substrates comprising a tungsten layer and silicon oxide layer were separately polished with Polishing Compositions 1A-1K, as described in Example 1. Polishing parameters were as follows: tool=MIRRA™, slurry flow rate=180 mL/min, platen speed/head speed=100/101 rpm, IT/RR/MP=207/414/207 hPa, ex. situ conditioner=SAESOL™ C1 20 N. Patterns were prepared prior to polishing with compositions 1A to 1K with commercially available W8051 polishing slurry, polished to endpoint +10%. W8051 tungsten polishing slurry was obtained from Cabot Microelectronics Corp. (Aurora, Ill.) and used as received with 2% hydrogen peroxide. A fixed polish time of 30 seconds was used for polishing with compositions 1A to 1K. Erosion data are averages of 3 line array sites. Localized erosion data are averages of averages of 2 isolated lines at each of 3 sites.

The polishing performance results are set forth in Table 4.

TABLE 4

Pattern Polishing Performance as Function of Silica Particles

| Polishing Composition | Field Oxide Loss (nm) | 0.18 × 0.18 μm array erosion[a] (nm) (error) | 0.18 × 0.18 μm isolated line local erosion (nm) (error) | 1 × 1 μm array erosion[b] (nm) (error) | 1 × 1 μm isolated line local erosion (nm) (error) |
|---|---|---|---|---|---|
| 1A (comparative) | 17.4 | 11.1 (1.7) | 15.4 (2.5) | 34.5 (0.6) | 24.6 (3.3) |
| 1D (comparative) | 14.0 | 12.8 (0.7) | 10.9 (1.6) | 13.2 (1.7) | 18.6 (1.2) |
| 1E (comparative) | 4.5 | 16.5 (1.7) | 7.7 (1.0) | 28.4 (1.9) | 17.3 (1.3) |
| 1F (comparative) | 9.9 | 18.7 (1.9) | 10.7 (2.9) | 28.1 (7.0) | 20.7 (2.9) |
| 1G (inventive) | 20.2 | 1.3 (0.5) | 0.9 (0.6) | 22.5 (1.4) | 7.4 (1.1) |
| 1H (inventive) | 20.6 | 4.8 (0.4) | 0.9 (0.9) | 24.9 (1.0) | 7.5 (1.3) |
| 1I (inventive) | 22.8 | −9.8 (7.3) | 1.1 (0.8) | 13.9 (1.8) | 2.5 (0.7) |
| 1J (inventive) | 13.5 | 7.1 (0.9) | 2.0 (0.4) | 9.5 (1.2) | 6.1 (1.7) |

TABLE 4-continued

Pattern Polishing Performance as Function of Silica Particles

| Polishing Composition | Field Oxide Loss (nm) | 0.18 × 0.18 μm array erosion[a] (nm) (error) | 0.18 × 0.18 μm isolated line local erosion (nm) (error) | 1 × 1 μm array erosion[b] (nm) (error) | 1 × 1 μm isolated line local erosion (nm) (error) |
|---|---|---|---|---|---|
| 1K (inventive) | 14.5 | 4.2 (1.7) | 0.4 (1.1) | 22.0 (0.3) | 7.1 (1.2) |

[a] The 0.18 × 0.18 μm array erosion is determined by measuring the difference between the tops of the lines in the array and the associated field oxide. Positive values correspond to an array which is recessed relative to the field oxide, and negative values correspond to an array that is protruded (raised) relative to the field oxide.
[b] The 1 × 1 μm array erosion is the determined by the measuring the difference between the oxide in the array and in the oxide in the field.
Positive values correspond to an array which is recessed relative to the field oxide, and negative values correspond to an array that is protruded (raised) relative to the field oxide.

As is apparent from the results set forth in Table 4, the inventive polishing compositions, which contained surface-modified colloidal silica particles, exhibited improved pattern performance. For example, when comparing inventive Polishing Composition 1G and Polishing Composition 1H to comparative Polishing Composition 1A, the inventive compositions exhibited higher field oxide loss (about 18% higher), lower erosion on the 0.18×0.18 μm line array (i.e., less than 10% of the erosion in the case of Polishing Composition 1G, and less than 50% of the erosion in the case of Polishing Composition 1H), and lower erosion on the 1×1 μm line array (i.e., about 65% of the erosion in the case of Polishing Composition 1G and less than 75% of the erosion in the case of Polishing Composition 1H).

The advantages of the inventive compositions are particularly noteworthy in the case of localized erosion. For example, inventive Polishing Composition 1G and Polishing Composition 1H exhibited less than 10% of the localized erosion of the comparative Polishing Composition 1A on the 0.18 μm isolated lines (i.e., 0.9 nm vs. 15.4 nm), and less than 33% of the localized erosion on the 1×1 μm isolated lines (i.e., 7.4 nm and 7.5 nm vs. 24.6 nm).

In addition, the inventive compositions are found to be useful over a wide formulation range including higher pH values like 3.5. For example, the improved pattern performance of the inventive formulations is demonstrated by comparing inventive Polishing Composition 1J with the comparative Polishing Composition 1F. The inventive Polishing Composition 1J exhibited a higher oxide loss (greater than 35% higher oxide loss, i.e., 13.5 nm vs. 9.9 nm), and a lower erosion on both the 0.18×0.18 μm array (less than 40% lower erosion, i.e., 7.1 nm vs. 18.7 nm), and the 1×1 μm array (less than 35% lower erosion, i.e., 9.5 nm vs. 28.1 nm) as compared to comparative Polishing Composition 1F. Furthermore, the localized erosion of inventive Polishing Composition 1J on the 0.18 μm isolated lines is only 20% that of the comparative Polishing Composition 1F (i.e., 2.0 nm vs. 10.7 nm), and only 30% of that of Polishing Composition 1F on the 1 μm isolated lines (i.e., 6.1 nm vs. 20.7 nm).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:
   (a) surface-modified colloidal silica particles comprising a negatively-charged group on the surface of the particles, wherein the surface-modified colloidal silica particles have
       a negative charge,
       a particle size of about 90 nm to about 350 nm, and
       a zeta potential of about −5 mV to about −35 mV at a pH of about 3,
   (b) an iron compound,
   (c) a stabilizing agent,
   (d) a corrosion inhibitor, and
   (e) an aqueous carrier.

2. The polishing composition of claim 1, wherein the negatively-charged group on the surface of the surface-modified colloidal silica particles comprises a sulfonate group, a carboxylate group, a phosphonate group, or combinations thereof.

3. The polishing composition of claim 1, wherein the surface-modified colloidal silica particles have a particle size of about 90 nm to about 200 nm.

4. The polishing composition of claim 3, wherein the surface-modified colloidal silica particles have a particle size of about 120 nm to about 180 nm.

5. The polishing composition of claim 1, wherein the pH of the polishing composition is about 1.5 to about 4.

6. The polishing composition of claim 5, wherein the pH of the polishing composition is about 2 to about 3.5.

7. The polishing composition of claim 1, wherein the surface-modified colloidal silica particles are present in the polishing composition in a concentration of about 1.5 wt. % to about 3.5 wt. %.

8. The polishing composition of claim 7, wherein the surface-modified colloidal silica particles are present in the polishing composition in a concentration of about 2 wt. % to about 3 wt. %.

9. The polishing composition of claim 1, wherein the iron compound comprises ferric nitrate or a hydrate thereof.

10. The polishing composition of claim 1, wherein the stabilizing agent comprises phosphoric acid, o-phosphoryl ethanolamine, alendronic acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid, propylenediaminetetraacetic acid, or combinations thereof.

11. The polishing composition of claim 10, wherein the stabilizing agent comprises malonic acid.

12. The polishing composition of claim 10, wherein the stabilizing agent is present in the polishing composition in a concentration of about 0.0001 wt. % to about 0.01 wt. %.

13. The polishing composition of claim 1, wherein the corrosion inhibitor comprises glycine, alanine, lysine, arginine, histidine, or combinations thereof.

14. The polishing composition of claim 13, wherein the corrosion inhibitor comprises alanine, glycine, lysine, or arginine.

15. The polishing composition of claim 14, wherein the corrosion inhibitor comprises glycine.

16. The polishing composition of claim 13, wherein the corrosion inhibitor is present in the polishing composition in a concentration of about 0.005 wt. % to about 1 wt. %.

17. The polishing composition of claim 16, wherein the corrosion inhibitor is present in the polishing composition in a concentration of about 0.1 wt. % to about 0.5 wt. %.

18. A method of chemically-mechanically polishing a substrate comprising:
(i) providing a substrate;
(ii) providing a polishing pad;
(iii) providing a chemical-mechanical polishing composition comprising:
(a) surface-modified colloidal silica particles comprising a negatively-charged group on the surface of the particles, wherein the surface-modified colloidal silica particles have
a negative charge,
a particle size of about 90 nm to about 350 nm, and
a zeta potential of about −5 mV to about −35 mV at a of about 3,
(b) an iron compound,
(c) a stabilizing agent,
(d) a corrosion inhibitor, and
(e) an aqueous carrier;
(iv) contacting the substrate with the polishing pad and the chemical mechanical polishing composition; and
(v) moving the polishing pad and the chemical-mechanical polishing composition relative to the substrate to abrade at least a portion of a surface of the substrate to polish the substrate.

19. The method of claim 18, wherein the negatively-charged group on the surface of the surface-modified colloidal silica particles comprises a sulfonate group, a carboxylate group, a phosphonate group, or combinations thereof.

20. The method of claim 18, wherein the surface-modified colloidal silica particles have a particle size of about 90 nm to about 200 nm.

21. The method of claim 20, wherein the surface-modified colloidal silica particles have a particle size of about 120 nm to about 180 nm.

22. The method of claim 18, wherein the pH of the polishing composition is about 1.5 to about 4.

23. The polishing composition of claim 22, wherein the of the pH of the polishing composition is about 2 to about 3.5.

24. The method of claim 18, wherein the surface-modified colloidal silica particles are present in the polishing composition in a concentration of about 1.5 wt. % to about 3.5 wt. %.

25. The method of claim 24, wherein the surface-modified colloidal silica particles are present in the polishing composition in a concentration of about 2 wt. % to about 3 wt. %.

26. The method of claim 18, wherein the iron compound comprises ferric nitrate or a hydrate thereof.

27. The method of claim 18, wherein the stabilizing agent comprises phosphoric acid, o-phosphorylethanolamine, alendronic acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid, propylenediaminetetraacetic acid, or combinations thereof.

28. The method of claim 27, wherein the stabilizing agent comprises malonic acid.

29. The method of claim 27, wherein the stabilizing agent is present in the polishing composition in a concentration of about 0.0001 wt. % to about 0.01 wt. %.

30. The method of claim 18, wherein the corrosion inhibitor comprises glycine, alanine, lysine, arginine, histidine, or combinations thereof.

31. The method of claim 30, wherein the corrosion inhibitor comprises alanine, glycine, lysine, or arginine.

32. The method of claim 31, wherein the corrosion inhibitor comprises glycine.

33. The method of claim 30, wherein the corrosion inhibitor is present in the polishing composition in a concentration of about 0.005 wt. % to about 1 wt. %.

34. The method of claim 33, wherein the corrosion inhibitor is present in the polishing composition in a concentration of about 0.1 wt. % to about 0.5 wt. %.

35. The method of claim 18, wherein the substrate comprises a tungsten layer on a surface of the substrate and a silicon oxide layer on a surface of the substrate, and wherein at least a portion of the tungsten layer and at least a portion of the silicon oxide layer are abraded to polish the substrate.

36. The method of claim 35, wherein the abrasion of at least a portion of the tungsten layer provides a removal rate for tungsten, wherein the abrasion of at least a portion of the silicon oxide layer provides a removal rate for silicon oxide, and wherein the ratio of the tungsten removal rate to the silicon oxide removal rate is about 0.5:1 to about 2.75:1.

\* \* \* \* \*